Patented Jan. 19, 1954

2,666,786

UNITED STATES PATENT OFFICE 2,666,786

TEREPHTHALIC ACID SYNTHESIS

Marshall Kulka and Richard H. F. Manske, Guelph, Ontario, Canada, assignors to United States Rubber Company, New York, N. Y., a corporation of New Jersey No Drawing. Application April 24, 1952, Serial No. 284,199

8 Claims. (Cl. 260—523)

This invention relates to a novel method of synthesizing terephthalic acid and more particularly to such a method wherein p-xylylene dichloride is converted to terephthalic acid by simultaneous hydrolysis and oxidation brought about by heating the p-xylylene dichloride with concentrated nitric acid.

Terephthalic acid gained considerable industrial importance when its use as an intermediate in the production of the polyester which is the basis of the new synthetic fiber known as Dacron was announced. The literature discloses preparation of terephthalic acid from a great many di-substituted benzenes. The oxidation of p-xylylene with alkaline potassium permanganate (Smith, J. Am. Chem. Soc., 43, 1920 (1921)) or with chromic oxide (Ospenson, Acta. Chem. Scand., 3, 211 (1949); C. A., 44, 1457 (1950)) in acetic acid yields terephthalic acid. It is asserted that air oxidation of p-xylylene in the presence of cobalt catalysts also yields terephthalic acid (Bowden, Henderon, Robinson and Imperial Chem. Ind. Ltd., Brit. pat., 623,836 (1949); C. A., 44, 4035 (1950); Dutch pat., 63,987 (1949; C. A., 44, 1539 (1950)). p-Di-tertiarybutyl-benzene, although untouched by potassium permanganate, chromic acid or nitric acid under ordinary conditions, is oxidized to terephthalic acid at 180° with 50% nitric acid (Legge, J. Am. Chem. Soc., 69, 2086 (1947)). Sodium dichromate and sulfuric acid convert p-cymene to terephthalic acid (Bogert and Harris, J. Am. Chem. Soc., 41, 1680 (1919)). p-Toluic acid has been oxidized to terephthalic acid with potassium permanganate (Frey and Horowitz, J. prakt. Chem., (2) 43, 116 (1891)), electrolytically (Allmand and Puttick, Trans. Faraday Soc., 23, 641 (1927), or with air in the presence of lead acetate as a catalyst (Gresham (du Pont), U. S. pat., 2,479,067 (1949); C. A., 44, 1139 (1950)). p-Methyl-acetophenone can be oxidized to terephthalic acid either with permanganate alone or nitric acid and permanganate (Randall, Benger, and Groocock, Proc., Roy. Soc. (London), A165, 432 (1938); C. A., 32, 5373 (1938); Koelsch, Org. Syntheses, 26, 95 (1946)). The hydrolysis of p-bis-trifluoromethylbenzene with a mixture of sulfuric and chlorosulfonic acids yields terephthalic acid (Scheurer and LeFave, J. Am. Chem. Soc., 72, 3308 (1950)). Potassium permanganate converts dihydro-p-tolualdehyde to terephthalic acid (Allen, Ball and Young, Can. J. Research, 9, 169 (1933)). Terephthalic acid may also be obtained from p-dibromobenzene or from p-chloro- or p-bromobenzoic acid by heating at 250° with potassium and cuprous cyanides (Rosenmund and Struck, Ber., 52, 1752 (1919)) and from p-dibromobenzene, butyllithium and carbon dioxide (Gilman, Langham and More, J. Am. Chem. Soc., 62, 2331 (1940). Finally terephthalic acid can be prepared from p-methylbenzyl chloride (Griffith, Plant and Newmann, Brit. patent, 644,707 (1950); C. A. 45, 4744 (1951)) and from p-xylylene dibromide by oxidation with aqueous potassium permanganate (Baeyer, Ann., 245, 138 (1888).

Our invention is based upon our discovery that p-xylylene dichloride can be converted to terephthalic acid in a simple and economical manner and with good yields by heating a mixture of the p-xylylene dichloride and nitric acid of a strength of from 70 to 100%. The conversion occurs in a single step which consists of two reactions, namely, the hydrolysis of the p-xylylene dichloride to p-bis(hydroxymethyl)benzene followed by oxidation of this intermediate alcohol without isolation and as it is formed to terephthalic acid. These two reactions occur simultaneously once reaction has been initiated.

The reactions are as follows:

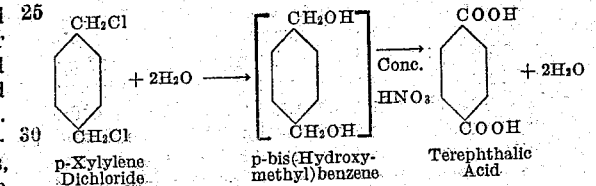

p-Xylylene Dichloride → p-bis(Hydroxymethyl)benzene → Terephthalic Acid

We have tried various concentrations of nitric acid ranging up to 100% but have found that a concentration of 70% $HNO_3$, the remainder of course being water, gives the best results. The use of nitric acid of concentration less than 70% not only produces an impure product but increases the oxidation time unduly and is not commercially feasible. The use of 100% nitric acid effects the oxidation but the oxidation is slower, and the use of 100% acid offers no advantage over the use of the 70% acid. If 100% nitric acid is used the presence of a trace of moisture in the initial mixture is desirable to start the reactions.

We much prefer to carry out the process of our invention in the presence of a solvent for the intermediates which are formed. We use any suitable solvent which is a solvent for the p-xylylene dichloride and for the intermediates, mainly p-bis(hydroxymethyl)benzene. The solvent should be inert and should also be liquid under the reaction conditions. We prefer to employ a solvent which is not a solvent for terephthalic acid so that the terephthalic acid precipitates as it is formed and so that no intermediates contaminate the terephthalic acid product. This greatly increases the purity of the terephthalic acid product and greatly simplifies the purification of the terephthalic acid.

As the solvent, we prefer to employ an aliphatic saturated monocarboxylic acid having from 2 to 6 carbon atoms per molecule. The acid used should be one which is liquid at the reaction temperature. The aliphatic saturated monocarboxylic acids are particularly advantageous as solvents because they are excellent solvents for p-xylylene dichloride and for the intermediates but are non-solvents for the terephthalic acid. Also, the aliphatic saturated monocarboxylic acids are not attacked by the strong nitric acid.

The preferred solvent is acetic acid, invariably employed in its glacial form. Although acetic acid is preferred, we can use its higher homologs such as propionic acid, butyric acid, etc.

Those skilled in the art will appreciate that the volume of solvent employed should be adjusted so that the intermediates will be held in solution while the terephthalic acid will be precipitated as formed. Those skilled in the art will be readily able to select the proper volume of solvent in the light of this disclosure. We typically employ an amount of solvent ranging from 2.5 to 8 times, preferably from 4 to 6 times, the weight of p-xylylene dichloride taken. If the amount is too small, the product is contaminated by intermediates. If the amount is too large the process is uneconomical.

The amount of concentrated nitric acid employed can vary considerably but should be sufficient to convert all of the p-xylylene dichloride taken to terephthalic acid. The use of a tremendous excess of nitric acid over the theoretical amount does not offer any particular advantage and is to be avoided because of cost considerations. We prefer to employ nitric acid in such amount that the weight of $HNO_3$ is from 1.5 to 3 times the weight of p-xylylene dichloride taken.

If a mixture of p-xylylene dichloride and o-xylylene dichloride, such as the crude mixture of chloromethylbenzenes obtained by chloromethylation of benzyl chloride as described hereinafter, is used instead of pure or nearly pure p-xylylene dichloride as the starting material in the practice of our invention, the proportions of solvent and of $HNO_3$ given above should be based upon the weight of the mixture instead of the weight of p-xylylene dichloride contained therein. The reason is that the hydrolysis and oxidation are not selective for the p-xylylene dichloride content but convert all of the chloromethylbenzenes present to oxidized hydrolysis products.

We typically carry out the reaction by heating the mixture of the p-xylylene dichloride or chloromethylbenzene mixture containing the same, concentrated nitric acid and solvent under refluxing conditions at at least atmospheric pressure. We have found that the reaction time depends upon the temperature and accordingly, we prefer to reflux the mixture under super-atmospheric pressure. Super-atmospheric pressures ranging from one-third of an atmosphere up to two atmospheres above ordinary atmospheric pressure can be attained without excessive investment cost in pressure equipment and are preferred.

Pressures up to two atmospheres above atmospheric can be employed without danger of nitration of the aromatic nucleus. At pressures of two atmospheres above atmospheric the reaction temperature is about 150° C.

The effect of pressure, and therefore of temperature, upon the time of reaction is indicated by the fact that when a mixture of 20 grams of p-xylylene dichloride, 40 cc. of 70% nitric acid and 90 cc. of glacial acetic acid is heated under reflux at atmospheric pressure 45 hours are required to complete the reaction. At a pressure equal to one-third of an atmosphere above atmospheric the reaction time is 24 hours while at a pressure of one atmosphere above atmospheric the time is reduced to 12 hours.

The reaction time typically ranges from 10 to 50 hours, the reaction mixture being heated under refluxing conditions throughout.

One of the by-products of the oxidation is nitrogen dioxide which is liberated copiously at the beginning of the reaction, the rate falling off gradually after the first few hours of the oxidation. When pure p-xylylene dichloride is used a yield of approximately 85% of terephthalic acid precipitates. The filtrate which contains some unoxidized intermediates can be used in subsequent runs especially after the water concentration has been properly adjusted by the addition of 100% nitric acid or of acetic anhydride or of both. Water is a product of the oxidation and therefore dilutes the reaction medium.

The p-xylylene dichloride used as the starting material in our invention can be made in any desired manner, its method of preparation constituting no part of the present invention. We often prefer to prepare the p-xylylene dichloride by the chloromethylation of benzyl chloride in the manner which has been described by one of us in an article entitled "Preparation of Poly-(chloromethyl) Benzenes" which appeared in Canadian Journal of Research, B, 23, 106–110 (1945). The chloromethylation of benzyl chloride gives mainly a mixture of o-xylylene dichloride and p-xylylene dichloride. This crude mixture can be used directly in the process of the present invention. Alternatively, if desired, the p-isomer can be separated from the o-isomer before carrying out our invention.

When a mixture of o-xylylene dichloride and p-xylylene dichloride such as is obtained by chloromethylation of benzyl chloride is used as the source of p-xylylene dichloride in the practice of our invention, the oxidation product consists of precipitated terephthalic acid and of phthalic acid together with some acids of the diphenylmethane type. The phthalic acid and the latter acids remain dissolved in the solvent. If the solvent is to be recycled, i. e., re-used to save the solvent contained therein as well as the intermediates, it will be necessary occasionally to remove the dissolved phthalic acid and acids of the diphenylmethane type periodically or continuously in order to prevent excessive accumulation thereof in the system.

In the typical practice of our invention, following completion or substantial completion of the reaction, we allow the reaction mixture to cool down to about atmospheric temperature whereupon we filter it to separate the terephthalic acid which we wash with water and dry in vacuum. The filtrate is typically fortified with concentrated nitric acid or with acetic anhydride or with both and re-used in the process, care being taken to re-run a suitable proportion thereof as required to keep the level of undesired ingredients at a suitable minimum.

It will be understood that in the typical practice of our invention no water is present in the initial mixture other than that presented by the nitric acid or by the recycled solvent. In other words, we typically employ anhydrous acetic acid or a homolog thereof as the solvent and introduce any water into the system by the use of 70% nitric acid, it being considerably cheaper to remove the water from acetic acid than from nitric acid. We so adjust the amount of water at the start of the reaction that the concentration of the nitric acid is equal to at least 70% at the start of the operation, when the $HNO_3$ and water are considered alone.

We find that the use of oxygen-containing gas does not assist the oxidation performed by our invention. In other words, the oxidation is not accelerated by the use of an oxygen-containing atmosphere over the reaction mixture or by bubbling an oxygen-containing gas through the reaction mixture.

We also find that materials which are commonly considered to be oxidation catalysts do not accelerate the oxidation. An example of such a material is vanadium pentoxide.

We further find that no advantage is gained by forming bis-p-acetoxymethylbenzene first followed by the oxidation.

EXAMPLE I

The following Table I reports 11 runs in each of which 20 g. of p-xylene dichloride was admixed with the indicated amounts of nitric acid and acetic acid (glacial), the mixture being heated under refluxing conditions for the indicated time after which the reaction mixture was cooled and filtered, the filtered precipitate being washed with water and dried in vacuum. Runs 1 to 8 were carried out at atmospheric pressure. In runs 1 to 3, the indicated amount of water was added to the initial mixture so that the concentration of the nitric acid was considerably below 70%. The results of runs 1 to 3 are not commercially acceptable.

*Table I*

| Expt. No. | Cc. 70% nitric acid | Cc. acetic acid | Cc. $H_2O$ added | Reaction time, hrs. | Yield, percent terephthalic | Neutral equivalent found [1] |
|---|---|---|---|---|---|---|
| 1 | 40 | 10 | 40 | 16 | 86 | 115 |
| 2 | 40 | 40 | 40 | 45 | 85 | 98 |
| 3 | 40 | 100 | 20 | 24 | 70 | 94 |
| 4 | 40 | 100 | 0 | 45 | 89 | 87 |
| 5 | 40 | 150 | 0 | 45 | 79 | 87 |
| 6 | 40 | 100 | 0 | 70 | 87 | 86 |
| 7 | 60 | 100 | 0 | 20 | 80 | 89 |
| 8 | (4) | 100 | 0 | 40 | 60 | 85 |
| 9 [2] | 40 | 100 | 0 | 24 | 84 | 85 |
| 10 [3] | 40 | 90 | 0 | 8 | 76 | 85 |
| 11 [3] | 40 | 90 | 0 | 12 | 84 | 85 |

[1] Neutral equivalent of terephthalic acid is 83.
[2] Experiment 9 was done under 5 lbs. pressure.
[3] Experiments 10 and 11 were done under 15 lbs. pressure.
[4] 100 percent $HNO_3$, 24 cc.

From Table I it will be seen that the purity of the product obtained in runs 1 to 3 was unsatisfactory, as is indicated by the high neutral equivalent thereof. In run 8, wherein 100% nitric acid was used, and no water was added, the yield fell off considerably although the purity of the product was good. The proportions and conditions used in run 11 are believed to represent the most favorable for practicing the invention, particularly from the standpoints of short reaction time, high yield and high purity of product.

The low yield in run 8 is attributable to the fact that virtually no water was present initially to start the reaction. More than a trace of water should be present initially in order to start the reaction with sufficient rapidity for commercial feasibility. The amount of water presented by 70% nitric acid, when used in the stoichiometric proportion, or in reasonable excess thereof, such as in the proportions indicated above, appears to be practically optimum.

The following examples are given to further illustrate the invention. Example II is a detailed description of run 11 of Table I.

EXAMPLE II

A reaction mixture of p-xylene dichloride (20 g.), concentrated (70%) nitric acid (40 cc.) and glacial acetic acid (90 cc.) was heated under reflux (reaction mixture temperature, 132°) for 12 hours under 15 lbs. pressure. The pressure was made by passing in a slow stream of compressed nitrogen through a tube above the reaction mixture and leading the off gases through a condenser, through a Dry-Ice trap (to trap the nitrogen dioxide) and into 760 mm. of mercury. The cooled reaction mixture was filtered, and the filter cake was washed with water and dried in vacuum, yield of terephthalic acid, 16.0 g. or 84%. Neutral equivalent, 85.

The above acid was suspended in methanol (400 cc.), conc. sulfuric acid (10 cc.) added and the reaction mixture heated under reflux for 20 hours. On cooling pure dimethyl terephthalate, M. P. 143–144° precipitated out. The yield from two consecutive crops was 17.0 g. or 90%.

EXAMPLE III

A reaction mixture of p-xylene dichloride (20 g.), concentrated (70%) nitric acid (40 cc.) and glacial acetic acid (100 cc.) was heated under reflux for 45 hours. The cooled reaction mixture was filtered, the precipitate washed and dried in vacuum; yield, 17.0 g. or 89%; neutral equivalent found, 87. This was converted to the dimethyl ester as described in Example II.

EXAMPLE IV

Benzyl chloride (100 g.), trioxymethylene (35 g.), zinc chloride (55 g.) and carbon tetrachloride (200 cc.) were stirred while dry hydrogen chloride was passed in for 8 hours. The temperature was maintained at 50–55° by cooling at first and warming later. The organic layer was washed well with water and the organic solvent distilled off. The residue of mixed chloromethylbenzenes (140 g.) was oxidized directly.

To the crude product (70 g.) was added acetic acid (280 cc.) and concentrated (70%) nitric acid (140 cc.) and the reaction mixture heated under reflux for 50 hours. The precipitate terephthalic acid) was filtered from the cooled reaction mixture, washed and dried. The yield was 29.5 g.

To the filtrate was added the other half of the crude mixed chloromethylbenzenes (70 g.), and concentrated (70%) nitric acid (105 cc.). The resulting reaction mixture was heated under reflux for 50 hours. After cooling the precipitated terephthalic acid was filtered off, washed and dried, yield 35 g. The total yield of terephthalic acid was 64.5 g. or 49% based on benzyl chloride. This product had a neutral equivalent of 87 and could be esterified as in Example II.

The filtrate was taken to dryness and the phthalic acid (18 g. or 14%) separated by sublimation at 0.3 mm. and 160° and was identified as the anhydride. The residue consisted of hot water-soluble acids of the diphenylmethane type.

From the foregoing description, it will be seen that our invention provides a simple, economical and effective method of preparing terephthalic acid from p-xylylene dichloride in good yield and with high purity of product. Thus the invention enables the commercial manufacture of terephthalic acid from benzyl chloride. The invention is particularly characterized by the simplicity with which it accomplishes conversion of the p-xylylene dichloride to terephthalic acid. An important advantage of the invention is that it does not entail purification or isolation of the intermediate p-bis-(hydroxymethyl)-benzene. Another advantage of the process of our invention is that it does not require the use of purified p-xylylene dichloride and thus enables use of the crude mixture of o- and p-xylylene dichlorides which is obtained by the chloromethylation of benzyl chloride. Numerous other advantages of our invention will be apparent to those skilled in the art.

Having thus described our invention, what we claim and desire to protect by Letters Patent is:

1. The method of converting p-xylylene dichloride to terephthalic acid which comprises refluxing a mixture of the p-xylylene dichloride, nitric acid having a concentration of from 70 to 100%, and a saturated aliphatic monocarboxylic acid having from two to six carbon atoms per molecule, said last-named acid serving to hold the reaction intermediates in solution but causing precipitation of the terephthalic acid as formed.

2. The method of converting p-xylylene dichloride to terephthalic acid which comprises refluxing at super-atmospheric pressure a mixture of the p-xylylene dichloride, nitric acid having a concentration of from 70 to 100%, and a saturated aliphatic monocarboxylic acid having from two to six carbon atoms per molecule, said last-named acid serving to hold the reaction intermediates in solution but causing precipitation of the terephthalic acid as formed.

3. The method of converting p-xylylene dichloride to terephthalic acid which comprises refluxing at super-atmospheric pressure of from one-third to two atmospheres above normal atmospheric pressure a mixture of the p-xylylene dichloride, 70% nitric acid and glacial acetic acid, said acetic acid serving to hold the intermediates in solution but causing precipitation of the terephthalic acid as formed.

4. The method of converting p-xylylene dichloride to terephthalic acid which comprises refluxing at super-atmospheric pressure of from one-third to two atmospheres above normal atmospheric pressure a mixture of p-xylylene dichloride, nitric acid having a concentration of from 70 to 100%, and a saturated aliphatic monocarboxylic acid having from two to six carbon atoms per molecule, said last-named acid serving to hold the reaction intermediates in solution but causing precipitation of the terephthalic acid as formed, the amount of said nitric acid being such that the weight of $HNO_3$ is from 1.5 to 3 times the weight of the p-xylylene dichloride and the amount of said saturated aliphatic monocarboxylic acid ranging from 2.5 to 8 times the weight of p-xylylene dichloride.

5. The method of making terephthalic acid which comprises refluxing at super-atmospheric pressure of from one-third to two atmospheres above normal at atmospheric pressure a mixture of chloromethylbenzenes containing p-xylylene dichloride, nitric acid having a concentration of from 70 to 100%, and a saturated aliphatic monocarboxylic acid having from two to six carbon atoms per molecule, said last-named acid serving to hold the reaction intermediates in solution but causing precipitation of the terephthalic acid as formed, the amount of said nitric acid being such that the weight of $HNO_3$ is from 1.5 to 3 times the weight of chloromethylbenzenes and the amount of said saturated aliphatic monocarboxylic acid ranging from 2.5 to 8 times the weight of chloromethylbenzenes.

6. A method as set forth in claim 4 wherein the amount of said saturated aliphatic monocarboxylic acid ranges from 4 to 6 times the weight of said p-xylylene dichloride.

7. A method as set forth in claim 5 wherein the amount of said saturated aliphatic monocarboxylic acid ranges from 4 to 6 times the weight of said chloromethylbenzenes.

8. The method of making terephthalic acid which comprises refluxing at a pressure ranging from atmospheric to two atmospheres above atmospheric a mixture of p-xylylene dichloride, nitric acid of a concentration of approximately 70%, and glacial acetic acid, said acetic acid serving to hold the intermediates in solution but causing precipitation of the terephthalic acid as formed.

MARSHALL KULKA.
RICHARD H. F. MANSKE.

References Cited in the file of this patent

UNITED STATES PATENTS

| Number | Name | Date |
|---|---|---|
| 939,940 | Barstow | Nov. 9, 1909 |
| 1,332,028 | Coblentz et al. | Feb. 24, 1920 |
| 1,488,730 | Beall et al. | Apr. 1, 1924 |
| 2,563,820 | Darrogh et al. | Aug. 14, 1951 |

FOREIGN PATENTS

| Number | Country | Date |
|---|---|---|
| 644,707 | Great Britain | Oct. 18, 1950 |
| 655,074 | Great Britain | July 11, 1951 |
| 979,063 | France | Dec. 6, 1950 |